US011964504B2

(12) United States Patent
Kumabayashi

(10) Patent No.: US 11,964,504 B2
(45) Date of Patent: Apr. 23, 2024

(54) PRINTER AND NON-TRANSITORY COMPUTER-READABLE RECORDING MEDIUM

(71) Applicant: SATO HOLDINGS KABUSHIKI KAISHA, Tokyo (JP)

(72) Inventor: Tomoyuki Kumabayashi, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 17/635,884

(22) PCT Filed: Jun. 12, 2020

(86) PCT No.: PCT/JP2020/023145
§ 371 (c)(1),
(2) Date: Feb. 16, 2022

(87) PCT Pub. No.: WO2021/053902
PCT Pub. Date: Mar. 25, 2021

(65) Prior Publication Data
US 2022/0288949 A1    Sep. 15, 2022

(30) Foreign Application Priority Data
Sep. 20, 2019   (JP) .................. 2019-171982

(51) Int. Cl.
*B41J 3/50*     (2006.01)
*B41J 3/01*     (2006.01)
(Continued)

(52) U.S. Cl.
CPC ............... *B41J 3/50* (2013.01); *B41J 3/4075* (2013.01); *B41J 29/393* (2013.01);
(Continued)

(58) Field of Classification Search
CPC .......... B41J 3/50; B41J 3/4075; B41J 29/393
(Continued)

(56) References Cited

U.S. PATENT DOCUMENTS

2007/0057050 A1    3/2007 Kiiuno et al.
2012/0193022 A1*   8/2012 Yamasita ............... B65C 9/42
                                                    156/354
(Continued)

FOREIGN PATENT DOCUMENTS

EP    2 481 675 A2    8/2012
JP    9-183426 A      7/1997
(Continued)

OTHER PUBLICATIONS

Extended European Search Report, European Application No. 20866346.8, dated Oct. 19, 2022.

*Primary Examiner* — Allyson N Trail
(74) *Attorney, Agent, or Firm* — Foley & Lardner LLP

(57) ABSTRACT

A printer, which is configured to print information on a print medium and issue the printed print medium, includes: a storage configured to store affixing position information relating to an affixing position in affixing the print medium to an item, in association with item information for identifying the item; a reception unit configured to receive input of the item information; an acquisition unit configured to acquire from the storage the affixing position information associated with the item information, based on the item information received by the reception unit; and a display control unit configured to cause a display unit to display the affixing position information that is acquired by the acquisition unit.

12 Claims, 13 Drawing Sheets

(51) Int. Cl.
*B41J 3/36* (2006.01)
*B41J 3/407* (2006.01)
*B41J 29/393* (2006.01)
*H04N 1/00* (2006.01)
*H04N 1/32* (2006.01)

(52) U.S. Cl.
CPC ....... *H04N 1/0044* (2013.01); *H04N 1/00466* (2013.01); *H04N 1/32138* (2013.01); *B41J 3/01* (2013.01); *B41J 3/36* (2013.01)

(58) Field of Classification Search
USPC ......................................................... 235/1 R
See application file for complete search history.

(56) References Cited

U.S. PATENT DOCUMENTS

| | | | |
|---|---|---|---|
| 2017/0068491 | A1 | 3/2017 | Yoshizawa |
| 2017/0210157 | A1* | 7/2017 | Obara .................... B41J 11/008 |
| 2021/0142020 | A1* | 5/2021 | Casavant ......... G06K 19/06028 |
| 2022/0288949 | A1* | 9/2022 | Kumabayashi ....... G06F 3/1208 |

FOREIGN PATENT DOCUMENTS

| | | |
|---|---|---|
| JP | 2006-27677 A | 2/2006 |
| JP | 2013-203013 A | 10/2013 |
| JP | 2014-151955 A | 8/2014 |
| JP | 2016-22648 A | 2/2016 |

\* cited by examiner

| PRODUCT CODE | PRODUCT NAME | PRODUCT IMAGE | AFFIXING INSTRUCTION IMAGE | PRINT CONTENTS |
|---|---|---|---|---|
| XXXXX | TV123 | xxx.jpg | xxx.jpg | ——— |
| XXXXX | CHAIR CDF | xxx.jpg | xxx.jpg | MANUFACTURER : xxx |
| XXXXX | PERSONAL COMPUTER ABC | xxx.jpg | xxx.jpg | MANUFACTURER : xxx |
| XXXXX | SOFA 456 | xxx.jpg | xxx.jpg | MANUFACTURER : xxx |
| ⋮ | ⋮ | ⋮ | ⋮ | ⋮ |

PRODUCT DATABASE

FIG.6

| TID | APPLICATION OF INLAY | AFFIXING INSTRUCTION IMAGE |
|---|---|---|
| XXXXX | SHIPPING LABEL | xxx.jpg |
| XXXXX | PRICE TAG | xxx.jpg |
| XXXXX | ———— | xxx.jpg |
| XXXXX | ———— | xxx.jpg |
| ⋮ | ⋮ | ⋮ |

PRODUCT DATABASE

FIG.13

PRINTER AND NON-TRANSITORY COMPUTER-READABLE RECORDING MEDIUM

FIELD

The present invention relates to a printer and a non-transitory computer-readable recording medium.

BACKGROUND

Among printers for issuing labels to be affixed on products, printers configured to display preview images of labels to be issued are conventionally known (for example, Japanese Unexamined Patent Application Laid-Open No. 2013-203013).

BRIEF SUMMARY

Technical Problem

In one example in which an operator affixes labels on items in an item factory or an inventory warehouse, although the affixing positions of labels are determined by operation procedures, affixing position failure occurs in some cases. In particular, in a situation in which labels are affixed to a wide variety of items having different affixing positions, affixing position failure easily occurs.

In view of this, an object of the present invention is to reduce the possibility of occurrence of affixing position failure in affixing a print medium, such as a label, to an item.

Solution to Problem

A printer configured to print information on a print medium and issue the printed print medium, the printer comprising a storage configured to store affixing position information relating to an affixing position in affixing the print medium to an item, in association with item information for identifying the item; a reception unit configured to receive input of the item information; an acquisition unit configured to acquire from the storage the affixing position information associated with the item information, based on the item information received by the reception unit; and a display control unit configured to cause a display unit to display the affixing position information that is acquired by the acquisition unit.

Advantageous Effects

One aspect of the present invention enables reducing the possibility of occurrence of affixing position failure in affixing a print medium to an item.

BRIEF DESCRIPTION OF DRAWINGS

FIG. 6 shows an example of data components of a product database.

FIG. 13 shows an example of data components of a product database according to a fifth embodiment.

DETAILED DESCRIPTION

The term "item" in this disclosure means a tangible entity, such as a finished article, a half-finished product (intermediate product in the midst of manufacturing), or a product. The following embodiments describe a product as an example of the item.

In each of the following embodiments, the printer can be used as a desktop printer or a mobile printer (portable printer). An affixing instruction image, which is described later, can be displayed on a relatively small display panel used in a mobile printer.

(1) First Embodiment

Figure 1:
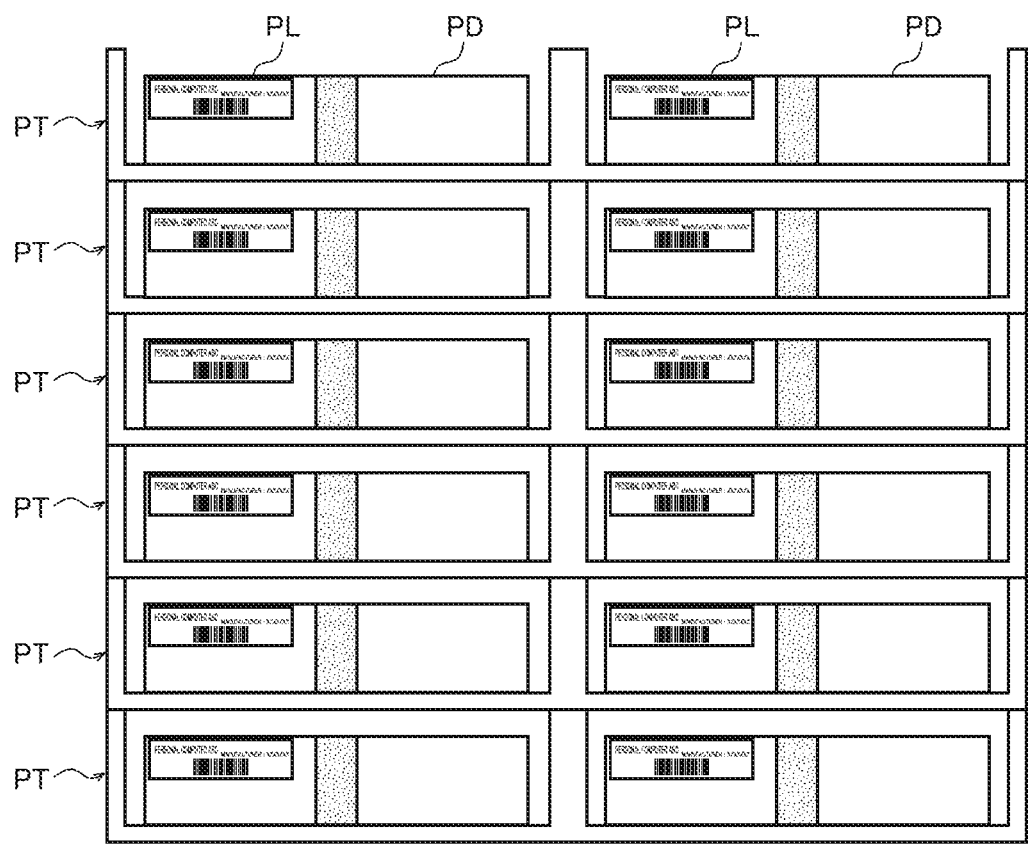
FIG. 1 is a font view of a group of products with attached labels that are issued by a printer of a first embodiment.

A use application of labels issued by a printer 1 according to this embodiment is shown in FIG. 1. FIG. 1 is a font view of a group of products with attached labels that are issued by the printer of this embodiment.

FIG. 1 shows a state in which multiple products PD each having an attached label PL are placed on pallets PT. The labels PL are affixed to the same positions on the products PD so as to each face the front side in the state in which the products PD are placed on the pallets PT. The aligned affixing positions of the labels PL, as shown in FIG. 1, are convenient for an operator to, for example, perform an inspection work on many products PD, such as in a factory or a warehouse.

In consideration of this, in order to prevent an operator from affixing a label PL to an incorrect position on a product PD, the printer 1 of this embodiment displays an image, such as an image for indicating an affixing position of a label PL, at the time of issuing the label PL.

(1-1) Structure of Printer

Figure 2:
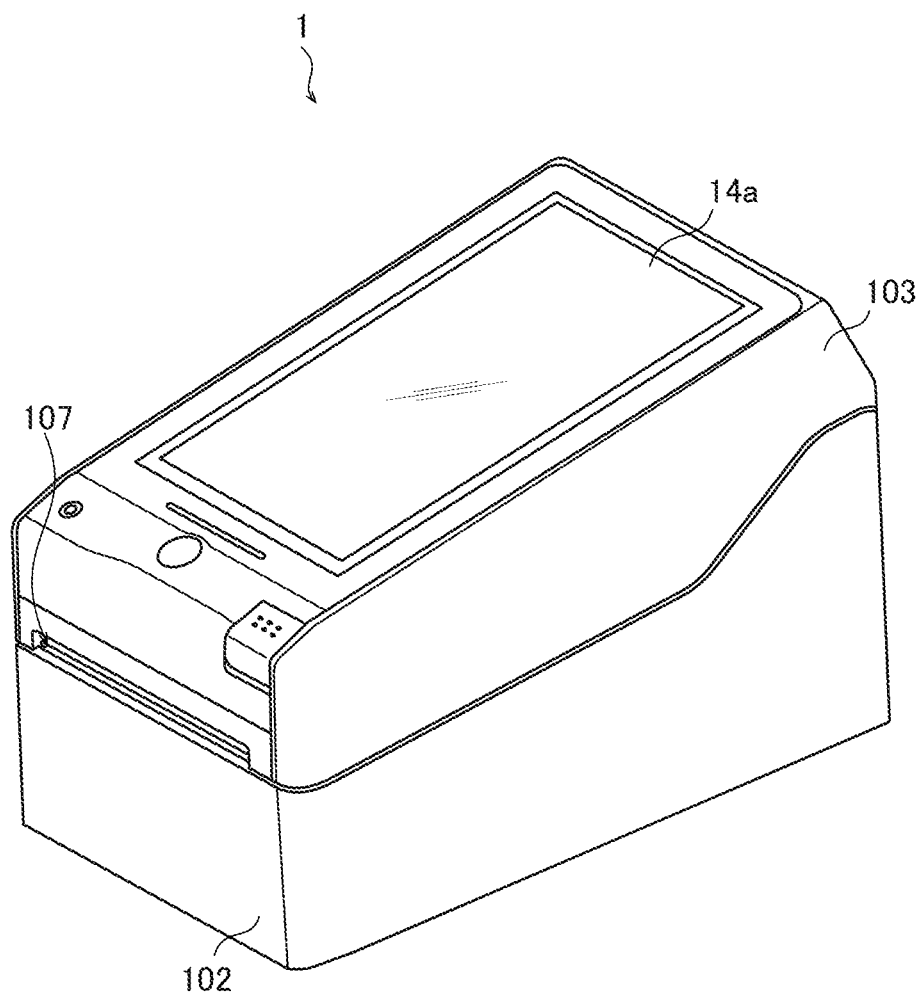
FIG. 2 is a perspective view of the printer of the first embodiment.
Figure 3A:
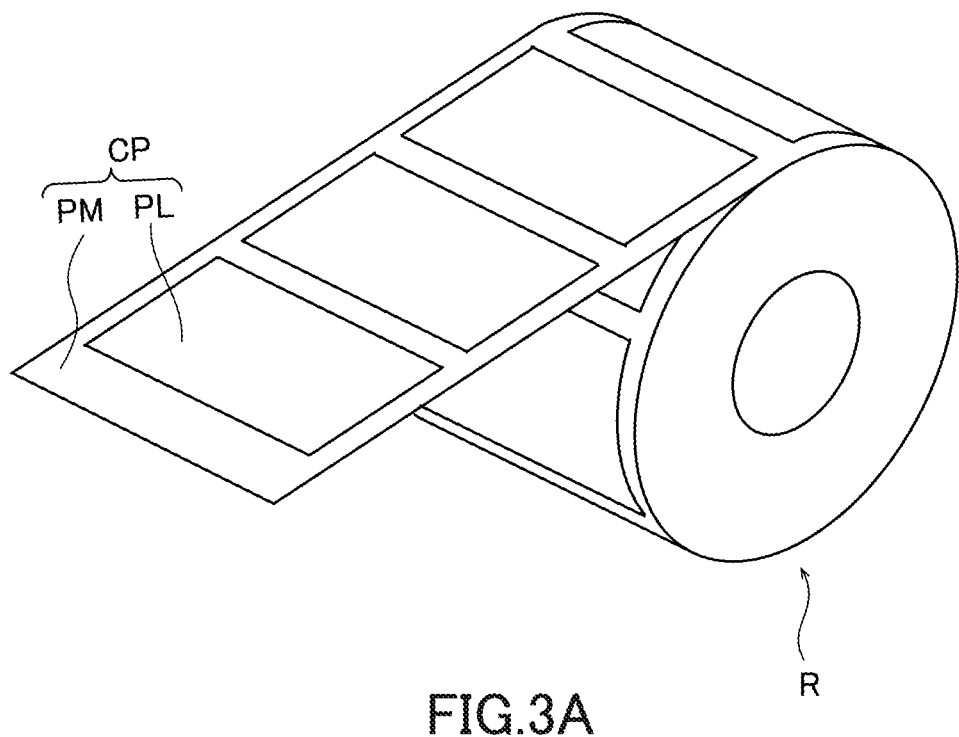
FIG. 3A shows a paper roll housed in the printer of the first embodiment.
Figure 3B:
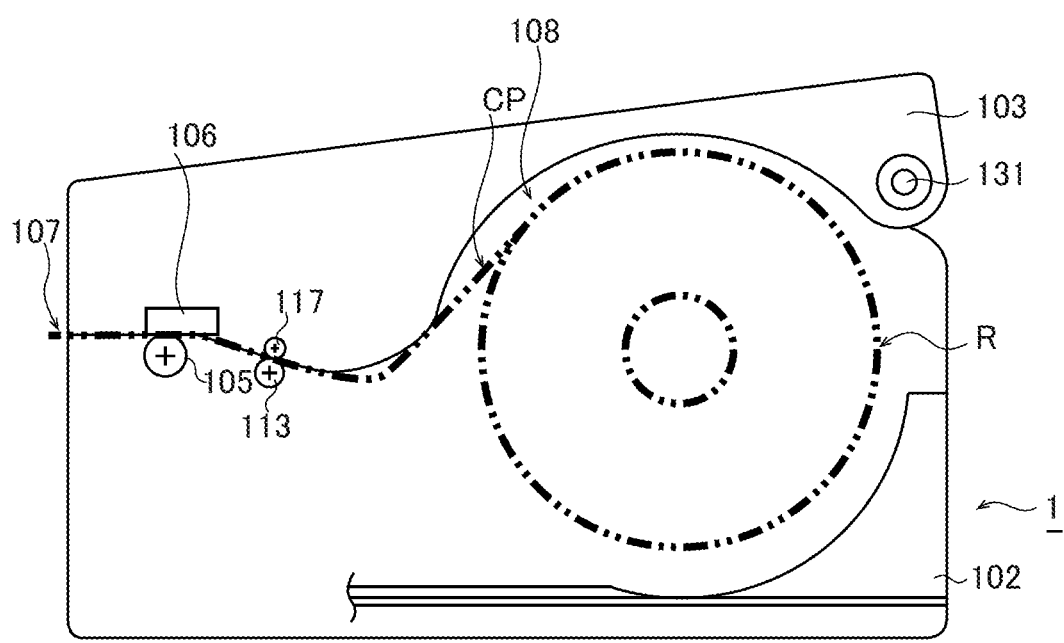
FIG. 3B illustrates printing operation of the printer.

Hereinafter, a structure of the printer 1 of this embodiment will be described with reference to FIGS. 2 to 3B. FIG. 2 is a perspective view of the printer 1 of this embodiment. FIG. 3A shows a paper roll R housed in the printer 1 of this embodiment. FIG. 3B illustrates printing operation of the printer 1.

As shown in FIGS. 2 and 3B, the printer 1 of this embodiment includes a case 102, a cover 103, a display panel 14a, a platen roller 105, a thermal head 106, a housing chamber 108, and auxiliary rollers 113 and 117.

As shown in FIG. 3B, the housing chamber 108 is provided within the case 102 to house the paper roll R. The cover 103 opens and closes the housing chamber 108 and is swingably supported at a shaft 131 by the case 102.

As shown in FIG. 2, the display panel 14a is provided to the outer side of the cover 103. The display panel 14a is, for example, a liquid crystal display panel with a touch panel function, and provides an input-output interface to a user in a state in which the cover 103 is closed.

As shown in FIG. 3B, a platen roller 105 is axially supported in a manner rotatable in forward and reverse directions, on the downstream in the feeding direction of the case 102. The platen roller 105 is a feeding unit for feeding continuous paper CP rolled out from the paper roll R and is formed in such a manner as to extend in the width direction of the continuous paper CP. The auxiliary roller 113 is provided on the case 102 side, whereas the auxiliary roller 117 is provided on the cover 103 side. In the state in which the cover 103 is closed, the auxiliary rollers 113 and 117 face each other across the continuous paper CP and help feeding the continuous paper CP to the platen roller 105.

As shown in FIG. 3A, the paper roll R is composed of a rolled continuous paper CP having a strip shape. In the example in the drawing, the continuous paper CP includes a belt-shaped mount PM and multiple labels PL that are temporarily attached on the mount PM at a predetermined interval. The labels PL are made of thermal paper or plain paper in accordance with situations. A thermal paper has a surface (that is, a printing surface) formed with a thermal color developing layer that develops a specific color (e.g., black or red) when reaching a predetermined temperature region. The back surface of the label PL is an adhesive surface that is coated with an adhesive agent. A surface in contact with the adhesive surface of the labels PL of the mount PM is coated with a release agent, such as silicone, to provide easy peeling off of the labels PL.

In the printer 1 of this embodiment, the continuous paper CP is rolled out from the paper roll R by rotation of the platen roller 105.

The thermal head 106 is disposed to the cover 103 so as to face the platen roller 105 while the cover 103 is closed. The thermal head 106 prints information on a label PL of the continuous paper CP rolled out from the paper roll R and includes multiple heating elements that are arranged in a line. While the cover 103 is closed, the thermal head 106 and the platen roller 105 pinch the continuous paper CP therebetween.

As shown in FIG. 3B, in the state in which the cover 103 is closed, in response to the platen roller 105 driven in the forward direction, the continuous paper CP is rolled out from the paper roll R to the platen roller 105 while being held between the auxiliary rollers 113 and 117. The continuous paper CP that has been printed by the thermal head 106, which faces the platen roller 105, is discharged to the outside of the printer 1 from an issue port 107 as an opening between the cover 103 and the case 102 in the state in which the cover 103 is closed.

(1-2) Display Examples of Printer

Figure 4:
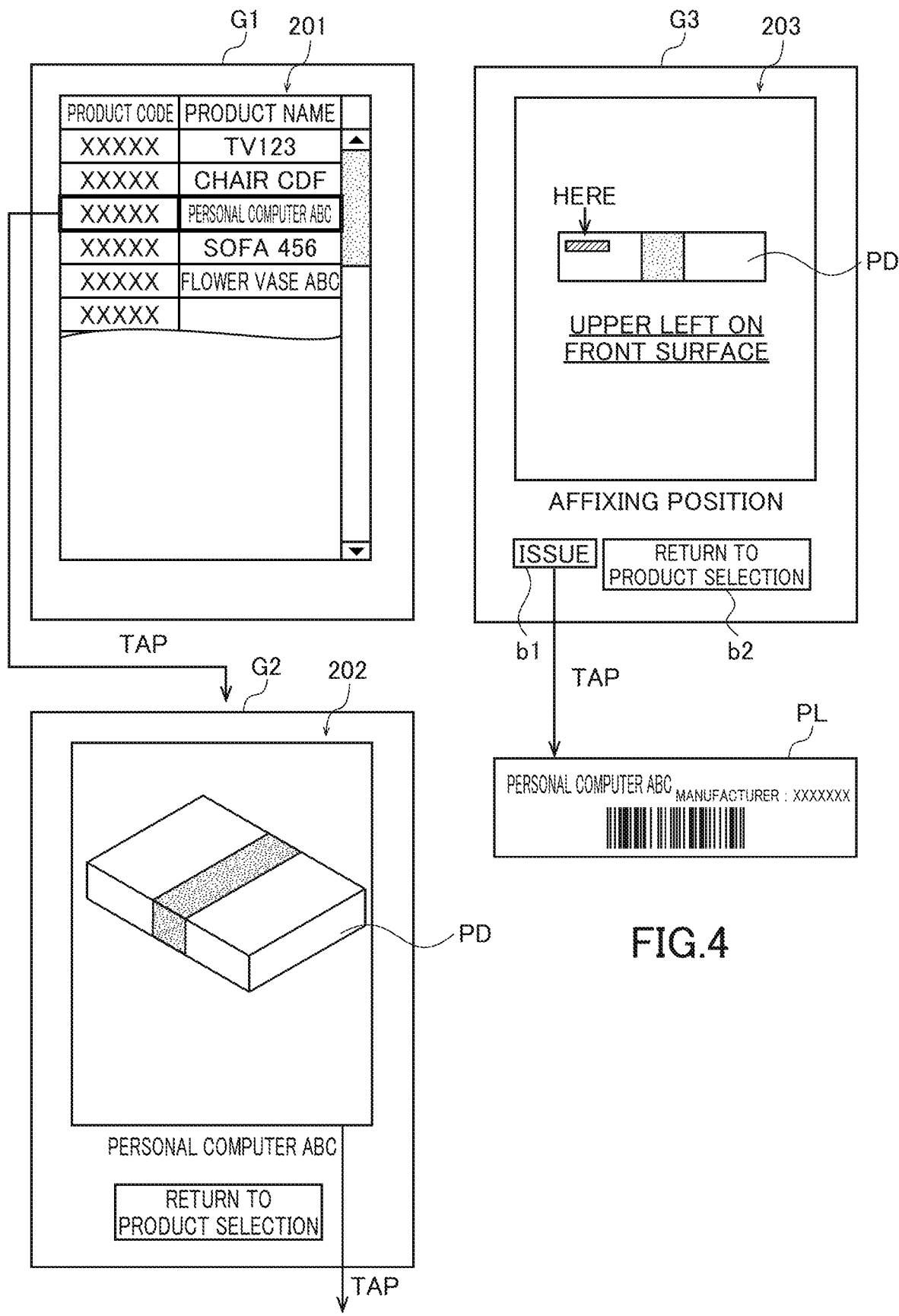
FIG. 4 illustrates a flow of displaying screens on the printer of the first embodiment.

Next, display examples of the printer 1 of this embodiment will be described with reference to FIG. 4. FIG. 4 illustrates a flow of displaying screens in issuing a label PL by the printer 1 of this embodiment.

In response to a predetermined operation on the display panel 14a of the printer 1, a product list 201 having a list of multiple products appears as shown in a screen G1. This product list 201 enables looking through all products by a scroll operation. In response to an operation to select any one of the products in the product list 201 (herein, a tap operation for selecting a "PERSONAL COMPUTER ABC"), a screen G2 containing a product image 202 of the selected product PD appears.

The product can be reselected by operating a button "RETURN TO PRODUCT SELECTION" to return to the screen G1.

In response to a tap operation at the position where the product image 202 is displayed in the screen G2, a screen G3 appears. The screen G3 contains an affixing instruction image 203. The affixing instruction image 203 indicates an affixing position to the selected product PD of the label PL. This image enables an operator to visually recognize the affixing position to the selected product PD of the label.

The printer 1 may include an audio output unit having a speaker. In this case, for example, a voice sound "Affix to an upper left on the front surface." may be output, or the affixing instruction image 203 may be displayed on the display panel 14a together with the audio output. In another example, while a video for showing the affixing position of the label in different displaying forms from various angles of the product PD is reproduced on the display panel 14a, the affixing position of the label may be explained in detail by audio that is output from the audio output unit.

The screen G3 contains a button b1 ("ISSUE") (example of operation content) and a button b2 ("RETURN TO PRODUCT SELECTION"). In response to a tap operation to the button b1, the label PL to be affixed to the selected product PD is issued. The product can be reselected by operating the button b2 to return to the screen G1.

Although FIG. 4 shows an example of displaying the affixing instruction image 203 after the product image 202 is displayed, the displaying order is not limited to this. The affixing instruction image 203 may be displayed without displaying the product image 202 after the product is selected in the product list 201.

FIG. 4 shows an example of displaying the issue button (button b1) together with the affixing instruction image 203, but the contents of the screen are not limited to this. The issue button (button b1) may be shown after the affixing instruction image 203 is displayed.

(1-3) Example of Internal Configuration of Printer

Figure 5:
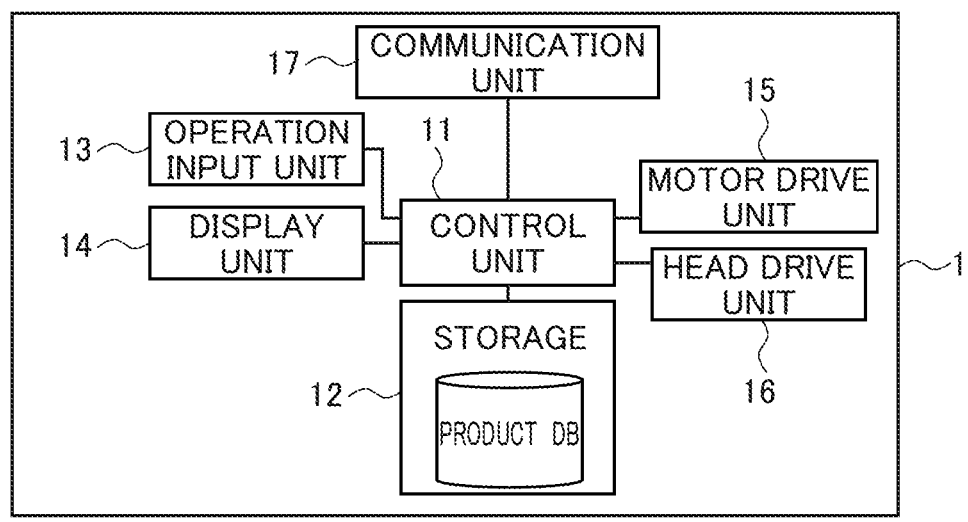
FIG. 5 is a block diagram showing an internal configuration of the printer of the first embodiment.

Next, an example of an internal configuration of the printer 1 of this embodiment will be described with reference to FIGS. 5 and 6. FIG. 5 is a block diagram showing an internal configuration of the printer 1 of this embodiment. FIG. 6 shows an example of data components of a product database.

With reference to FIG. 5, the printer 1 includes a control unit 11, a storage 12 (example of a storage), an operation input unit 13, a display unit 14, a motor drive unit 15, a head drive unit 16, and a communication unit 17.

The control unit 11 includes a microcomputer and a memory (random access memory (RAM) or read only memory (ROM)) and controls operation of the printer 1. The microcomputer reads and executes various programs (including firmware and an affixing instruction program that is described later) stored in the memory, after the printer 1 is powered on.

The storage 12 is a storage device, such as a solid state drive (SSD). The storage 12 stores data of a layout and a format of a label PL, which are read by the firmware in printing the label PL.

The control unit 11 creates print data based on the data of the layout and the format of a label PL recorded in the storage 12 and sends a print instruction including the print data, to the motor drive unit 15 and the head drive unit 16.

The storage 12 stores a product database, as shown by the example in FIG. 6. Each record of the product database stores a value of each of fields "PRODUCT CODE", "PRODUCT NAME", "PRODUCT IMAGE", "AFFIXING INSTRUCTION IMAGE", and "PRINT CONTENTS".

The "PRODUCT CODE" field stores a value of a product code (example of item information) for identifying a product.

The "PRODUCT NAME" field stores a value that shows a name of a product.

The "PRODUCT IMAGE" field stores a value for specifying (or referring to) a product image. The product image is read, for example, in displaying the product image 202 in FIG. 4.

The "AFFIXING INSTRUCTION IMAGE" field stores a value for specifying (or referring to) an image (affixing instruction image) that indicates an affixing position to a product of a label. The affixing instruction image is read, for example, in displaying the affixing instruction image 203 in FIG. 4. The affixing instruction image is an example of an image that shows an affixing position of a print medium. The affixing instruction image 203 is not limited to a still image and may be a video. In addition, the affixing instruction image 203 may also include audio irrespective of a still image or a video.

The "PRINT CONTENTS" field can store any value that shows a content to be printed on a label, and for example, it stores a value that shows a manufacturer of product, price, color, model, or the like.

The operation input unit 13 includes an input device, for example, having various operation buttons, or a touch panel input mechanism provided to the display panel 14a, and an input interface circuit for receiving operation input by a button operation or a touch panel operation. The operation input unit 13 is an example of a reception unit that receives a product code as item information.

The display unit 14 includes a display panel 14a (refer to FIG. 2) and a driving circuit for displaying an image on the display panel 14a. The display unit 14 displays an execution result of the firmware and the affixing instruction program.

The control unit 11 functions as the following units with the microcomputer executing the affixing instruction program.

(i) A reception unit that receives input of a product code (example of item information)
 (ii) An acquisition unit that accesses a product database to acquire an affixing instruction image (example of affixing position information) associated with the input product code
 (iii) A display control unit that displays the acquired affixing instruction image on the display panel 14a The control unit 11 is an example of a reception unit, an acquisition unit, and a display control unit.

The unit (iii) preferably displays an issue button (example of operation content) of a label to be affixed on a product associated with the affixing instruction image, as shown in the screen G3 in FIG. 4. An operator can issue a label immediately after checking the affixing position in the affixing instruction image or the like, thereby being able to affix the label on the product before forgetting the affixing position.

The motor drive unit 15 drives a stepping motor (not shown) that controls rotation of the platen roller 105, to draw and feed the continuous paper P from the paper roll R housed in the printer 1.

The motor drive unit 15 feeds the continuous paper CP by a feeding amount and in the feeding direction (forward or reverse direction) that are specified by a print instruction from the control unit 11. The specified feeding direction and feeding amount correspond to, for example, the rotation direction and the number of steps of the stepping motor. The motor drive unit 15 drives the stepping motor based on the rotation direction and the number of steps.

The head drive unit 16 causes electric current to selectively flow to each heating element of the thermal head 106 upon receiving a print instruction including print data from the control unit 11. The heating element that generates heat by electric current is pressed against the label PL, which is fed by the platen roller 105. This causes the part of the label PL, against which the heating element is pressed, to develop color, whereby the label PL is printed. The head drive unit 16 is an example of a print unit.

The communication unit 17 includes a communication interface circuit for communicating with an external device. The communication unit 17 sends and receives information with an external device by a wired communication via a communication cable or the like, or by a wireless communication.

The printer 1 of this embodiment is used such that an operator inputs to select a specific product on the display panel 14a first in issuing a label to be affixed on the product. In response to the selection input, the control unit 11 of the printer 1 reads the affixing instruction image or the like corresponding to the selected product code from the product database and displays it on the display panel 14a. Thus, the operator can visually recognize the affixing position on the product of the label to be issued. Under these conditions, the label corresponding to the selected product is issued in response to the operator operating the issue button. The operator recognizes the affixing position of the label at this time, and therefore, the possibility of occurrence of affixing position failure can be reduced in affixing the issued label on the product.

In particular, as to a printer 1 being a mobile printer that can be carried, works of issuing labels of a wide variety of products and affixing the labels thereto are performed by an operator, for example, while the operator moves in a warehouse. Even in such a case, affixing position failure by the operator can be reduced because an affixing work can be easily performed by checking the affixing position of each product in the affixing instruction image that is displayed on the printer 1 each time of issuing a label.

(2) Second Embodiment

Figure 7:
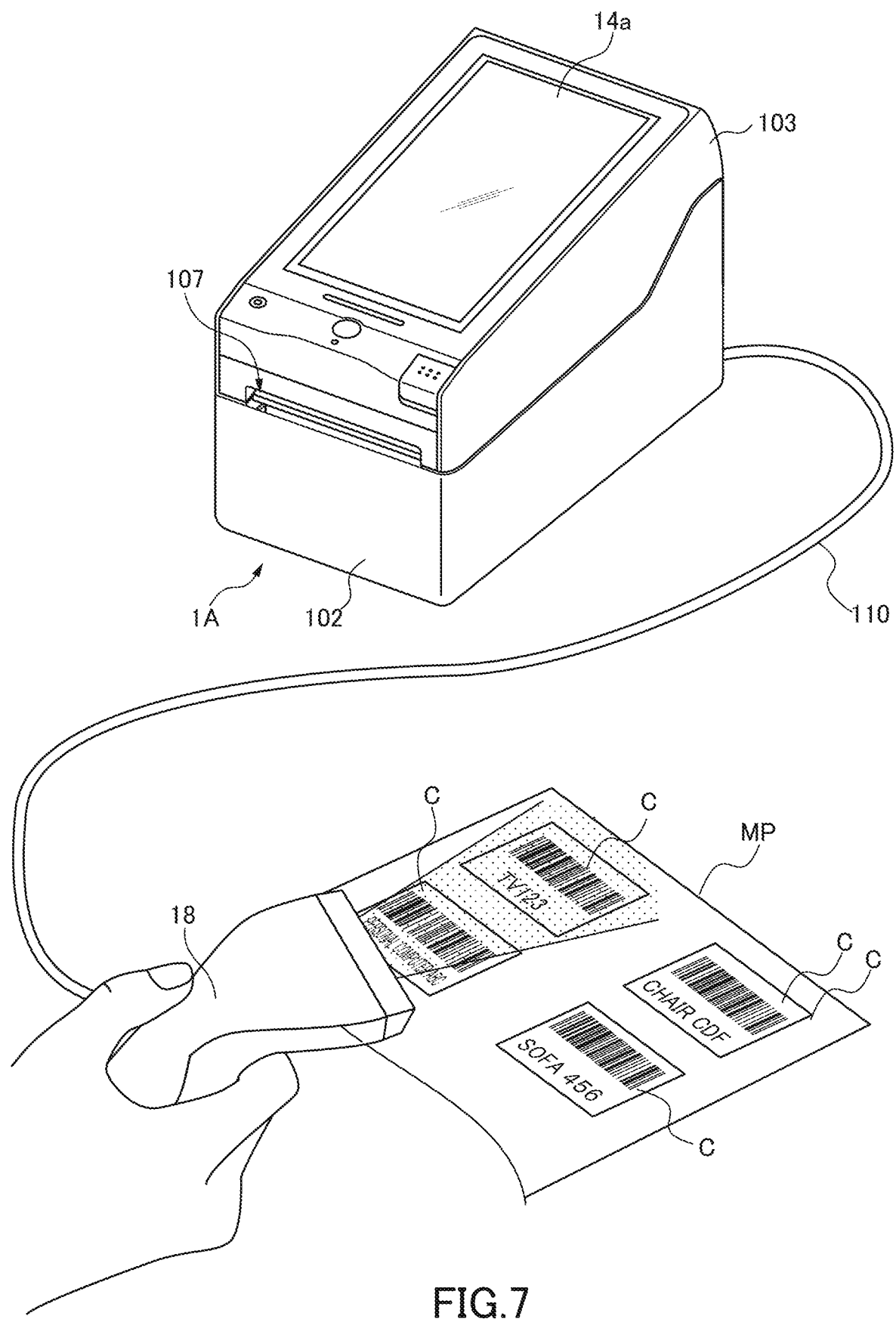
FIG. 7 shows an example of using a printer according to a second embodiment.

A printer 1A according to a second embodiment will be described with reference to FIG. 7. FIG. 7 shows an example of using the printer 1A according to the second embodiment.

The printer 1A of this embodiment differs from the printer 1 of the first embodiment in that a code scanner 18 (example of a reader) is connected via a communication cable 110. The code scanner 18 may communicate with the printer 1 via wireless communication.

As shown in FIG. 7, an operator uses the code scanner 18 to, for example, scan code information C corresponding to each of multiple products printed on an input paper MP. A bar code including a corresponding product code, a character string showing a product name, etc. are printed as the code information C.

The communication unit 17 of the printer 1A of this embodiment communicates with the code scanner 18 that reads the code information C. The control unit 11 (example of a reception unit of this embodiment) of the printer 1A inputs a product code that the communication unit 17 receives from the code scanner 18, and it performs processing similar to that in the first embodiment. That is, the control unit 11 functions as a reception unit that receives a product code as item information, based on the code information C that is received by the communication unit 17 from the code scanner 18.

The code scanner 18 includes a light source, such as an LED, an optical mechanism, an image sensor, and a digital processing circuit. The code scanner 18 emits light that is output from the light source, to a bar code of external code information C. The light that is reflected back from the bar code is imaged by the image sensor via the optical mechanism. The digital processing circuit of the code scanner 18 digitizes and analyzes a signal that is photoelectrically converted by the image sensor, and it extracts (reads) a product code contained in the bar code.

The communication unit 17 receives the product code that is sent from the code scanner 18. Operation of the printer 1A after the product code is read is the same as that of the printer 1 of the first embodiment. That is, the control unit 11 of the printer 1A causes displaying a product image 202 and an affixing instruction image 203 (refer to FIG. 4) corresponding to the read product code and issues a label PL in response to operation to the issue button.

The printer 1A of this embodiment eliminates the need for an operator to display a product list 201 on the display panel 14a. In one example, it is possible for an operator to display an affixing instruction image or the like, with easy operation, after checking a product name printed on the input paper MP.

(3) Third Embodiment

Next, a printer 1B according to a third embodiment will be described with reference to FIGS. 8 to 11D.

Figure 8:
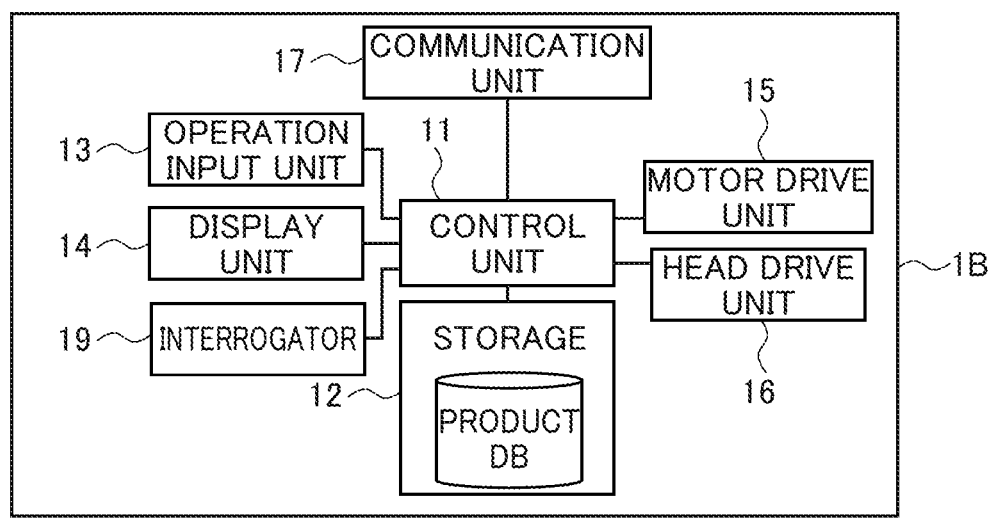
FIG. 8 is a block diagram showing an internal configuration of a printer of a third embodiment.
Figure 9:
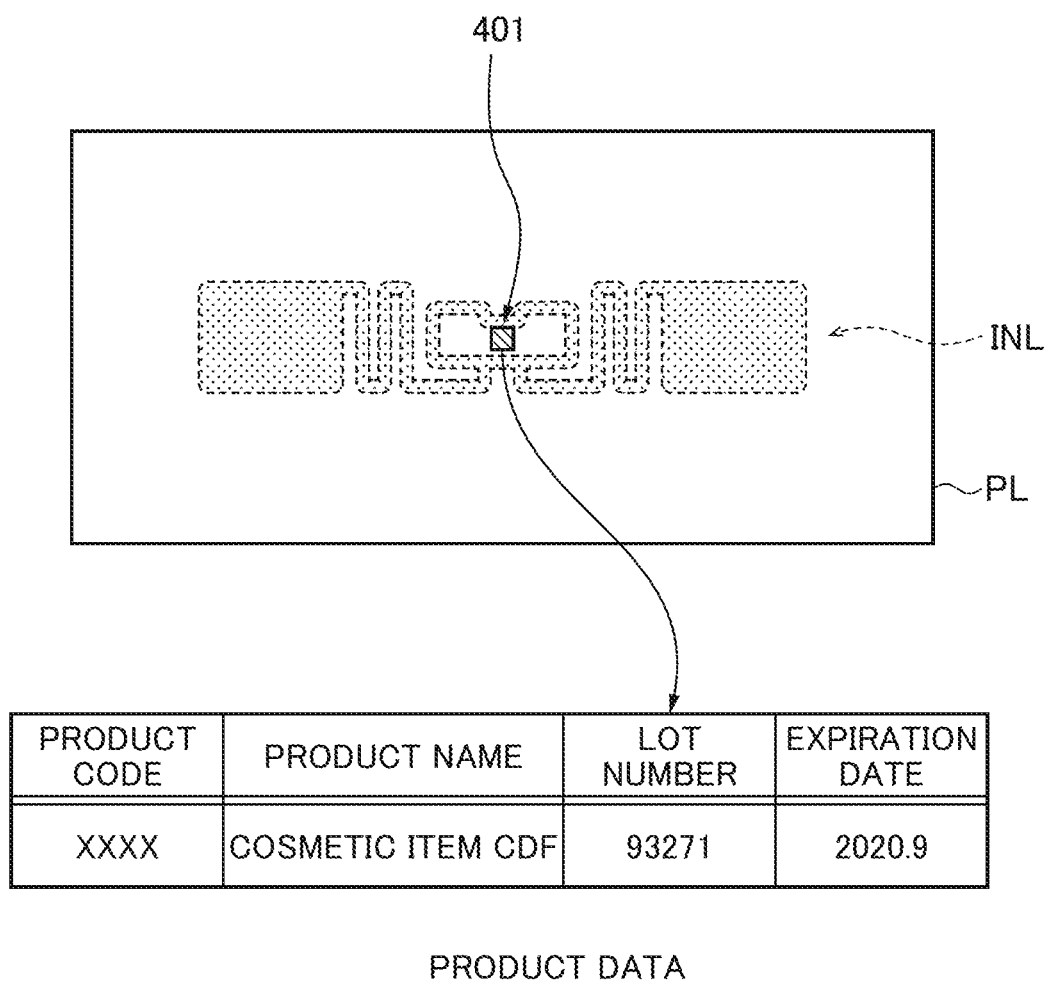
FIG. 9 shows a structural example of a label used in the printer of the third embodiment.
Figure 10:
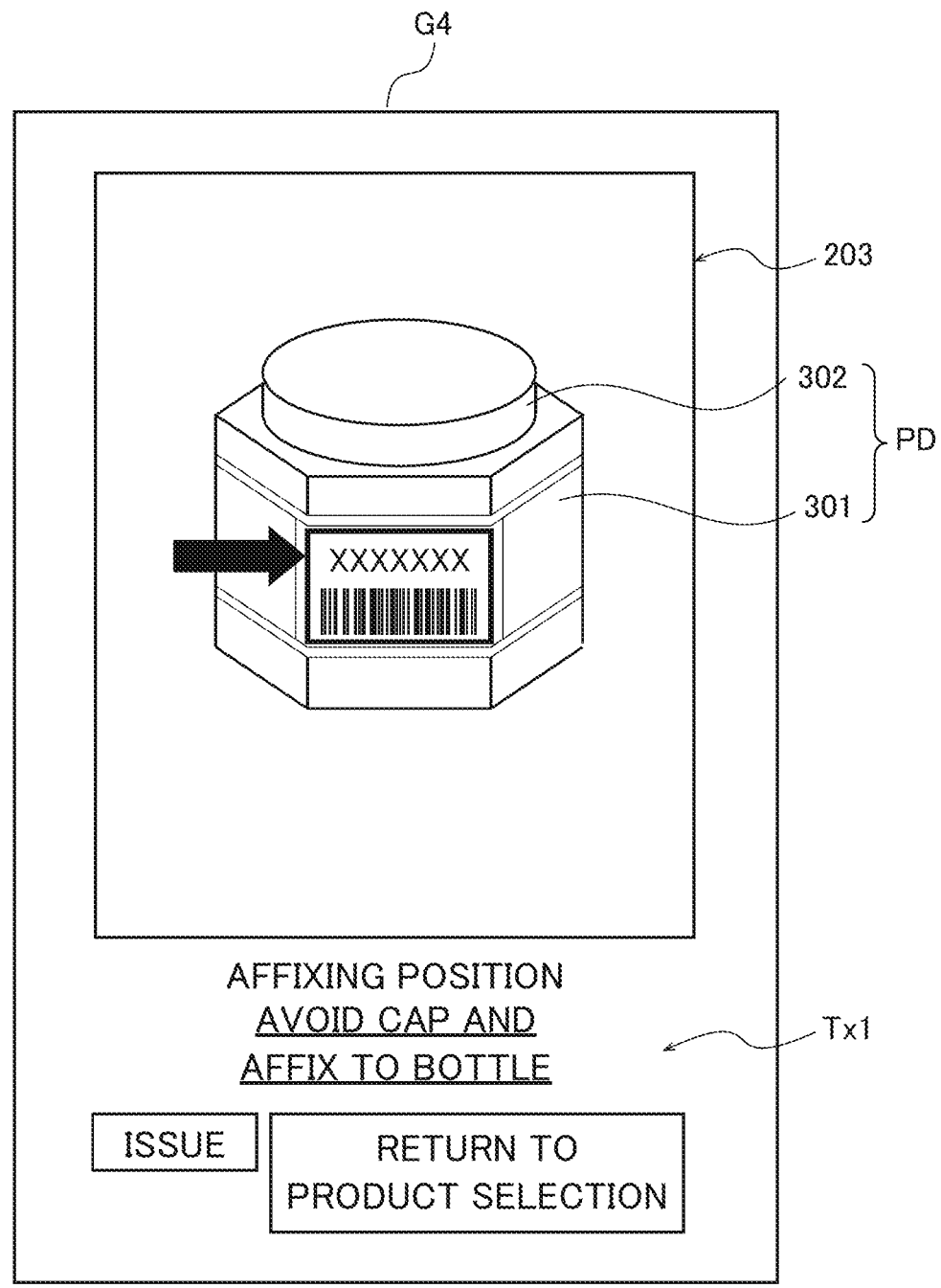
FIG. 10 shows an example of a screen displayed on the printer of the third embodiment.

FIG. 8 is a block diagram showing an internal configuration of the printer 1B of this embodiment. FIG. 9 shows a structural example of a label PL used in the printer 1B of this embodiment. FIG. 10 shows an example of a screen displayed on the printer 1B of this embodiment. FIGS. 11A to 11D show examples of an affixing position to a product of a label PL issued by the printer 1B of this embodiment.

Matters that are not particularly described as to the printer 1B of this embodiment are the same as those for the printer 1 of the first embodiment, and duplicated description will be omitted.

As shown in FIG. 8, the printer 1B of this embodiment further includes an RFID interrogator 19, relative to the printer 1 (refer to FIG. 5) of the first embodiment. The interrogator 19 is an example of an RFID reader and an RFID writer. The interrogator 19 reads and writes data in a radio frequency identification (RFID) inlay.

As shown in FIG. 9, a label PL that is used in the printer 1B of this embodiment has an inlay INL. The inlay INL is, for example, embedded in a label PL. The inlay INL is composed of an IC chip 401 and a thin film antenna that is coupled to the IC chip 401. The inlay INL communicates with the interrogator 19 and writes product data in the IC chip 401 at the time of issuing a label PL. The product data contains at least a product code and a product name, and may also include accompanying data relating to a product, such as a lot number, an expiration date, etc. of a product.

Although not shown in the drawing, the interrogator 19 includes an antenna for wirelessly communicating with the inlay INL of the label PL and includes an interrogator (reader/writer) connected to the antenna. These antenna and interrogator are provided in the vicinity of the feeding path of the continuous paper CP in the printer 1B. The interrogator 19 writes (encodes) data in the inlay INL around the time when a label PL is printed.

The IC chip 401 of the inlay INL is able to store a great amount of data in contrast with a bar code and the like. From this point of view, affixing a label PL with an embedded inlay INL to a product is advantageous in ensuring good traceability of the product.

On the other hand, the antenna of the inlay INL is susceptible to surrounding environment. For example, in a case in which a label PL is affixed to a conductive material, such as a metal part of a product, or a product contains liquid (e.g., a bottle of skin lotion), a communicable range is drastically reduced, and in the worst case, communication cannot be performed. In consideration of this, in affixing a label PL with an embedded inlay INL to a product, attention should be paid so as to not affix it to an incorrect position.

In one example, FIG. 10 shows a screen G4 containing an affixing instruction image 203 that is displayed on the display panel 14a, of the printer 1B of this embodiment. This screen G4 corresponds to the screen G3 in FIG. 4.

In the screen G4, it is assumed that the product PD has a body 301 and a cap 302, the body 301 is a glass bottle, and the cap 302 is made of metal, such as aluminum. In this case, it is preferable to display a text Tx1 that instructs to avoid the cap 302 and affix to the body 301, as an affixing position. In addition to this, the affixing position is preferably indicated by an arrow in the affixing instruction image 203. That is, preferably, the arrow indicating the affixing position is also a part of the affixing instruction image 203. The affixing instruction image 203 is not limited to a still image and may be a video.

In order to display a text Tx1 or the like, which shows an affixing position including notes, etc., the text Tx1 is stored in the product database (FIG. 6) in association with the affixing instruction image 203. When being displayed on the display panel 14a, the text Tx1 is read from the product database together with the associated affixing instruction image 203.

In addition, the affixing instruction image 203 may be associated with audio irrespective of a still image or a video. In this case, at the time the affixing instruction image 203 appears on the display panel 14a, the audio associated with the affixing instruction image 203 is reproduced.

FIGS. 11A to 11D show affixing instruction images of products PD having various forms, for labels PL with an embedded inlay INL.

Figure 11A:
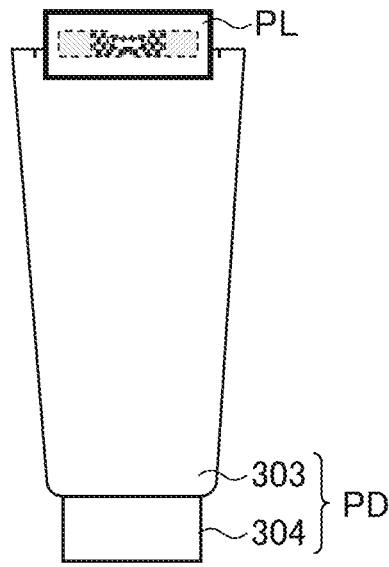
FIGS. 11A to 11D show examples of an affixing position to a product of a label issued by the printer of the third embodiment.

The product PD in FIG. 11A is a tubular cosmetic, and it has a body 303 and a cap 304. Herein, it is assumed that the body 303 is made of resin, but contains materials including a metal component. In this case, an instruction is made to affix the label PL so that the inlay INL will protrude from the body 303, whereby reduction in communication performance of the inlay INL is suppressed.

Figure 11B:
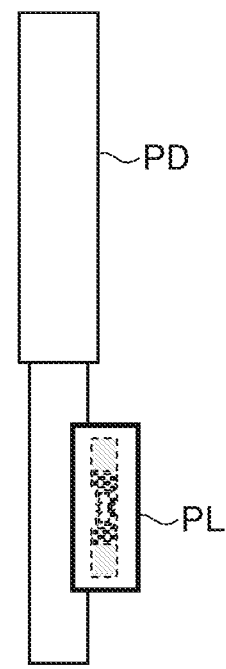

The product PD in FIG. 11B is a pencil type cosmetic and is assumed to have a surface entirely made of metal. In this case, an instruction is made to affix the label PL so that the inlay INL will protrude from the product PD, whereby reduction in communication performance of the inlay INL is suppressed.

Figure 11C:
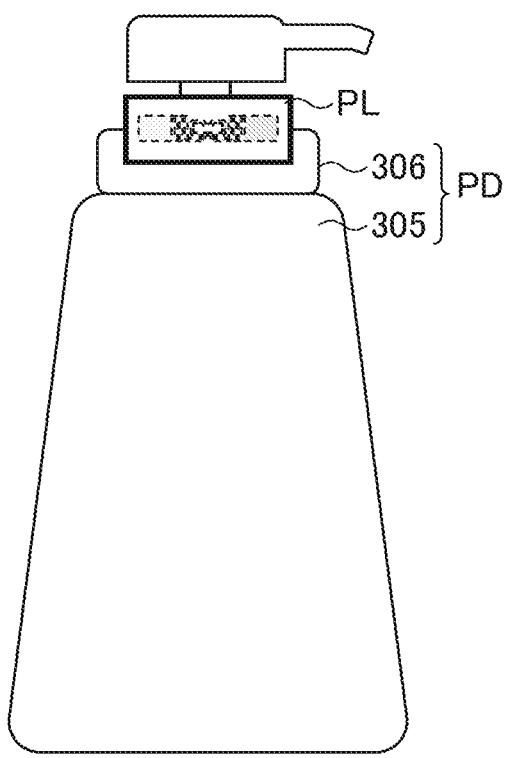

The product PD in FIG. 11C has a shape of a pump bottle and is assumed to have a resin body 305 and a resin cap 306. In this case, even if the content contains a metal material, reduction in communication performance of the inlay INL is suppressed by instructing to affix to the cap 306.

Figure 11D:
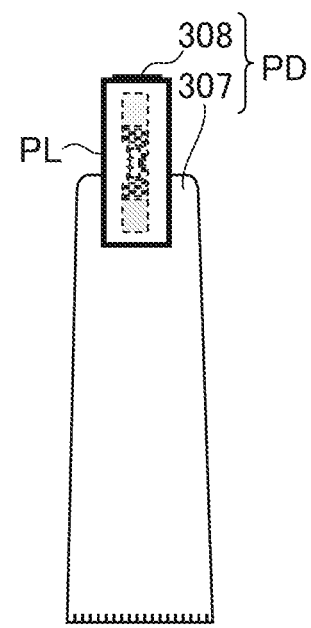

The product PD in FIG. 11D is a nail cosmetic and has a body 307 and a cap 308. It is assumed that the body 307 contains materials including a metal material. Also in this case, reduction in communication performance of the inlay INL is suppressed by instructing to affix to the cap 308.

Use of the printer 1B of this embodiment enables reducing the possibility of occurrence of affixing position failure in affixing an issued label to a product. Thus, deterioration in communication performance of the inlay contained in the label can be suppressed.

(4) Fourth Embodiment

For example, the first embodiment describes a case in which the product database is recorded in the storage 12 of the printer 1, but a location where the product database is recorded is not limited to this. The product database may be recorded in other device that is communicable with the printer 1. In one example, an information processing system 6 shown in FIG. 12 includes the printer 1 of the first embodiment and a server 5 that can communicate with the printer 1 via a network NW, such as the Internet or an intranet. In this case, the product database may be recorded in the server 5. As necessary, the control unit 11 of the printer 1 functions as an inquiry unit that sends to the server 5 an inquiry with a received product code via the communication unit 17.

When receiving the inquiry from the printer 1, the server 5 refers to the product database and sends to the printer 1 an affixing instruction image or the like associated with the product code in the inquiry. Then, the control unit 11 of the printer 1 functions as an acquisition unit that acquires the affixing instruction image or the like from the server 5 via the communication unit 17. Moreover, the control unit 11 causes the display panel 14a to display the acquired affixing instruction image or the like.

The affixing instruction image itself may not be sent from the server 5 to the printer 1, and instead, identification information for identifying the affixing instruction image or the like may be sent. In such a case, multiple affixing instruction images or the like corresponding to identification information are stored in the printer 1, and an affixing instruction image corresponding to received identification information is displayed on the display panel 14a.

(5) Fifth Embodiment

In this embodiment, it is assumed that the printer 1A, which is described in relation to the second embodiment (refer to FIG. 8; the printer connected to the code scanner 18), is connected to a server 5 that is communicable via a network NW. In addition, in this embodiment, a label PL containing an inlay INL is used, and the printer 1A prints information relating to a product, on the label PL, and writes (namely, encodes) electronic product code (EPC) data as a standard identification code, in the inlay INL.

In this embodiment, a bar code that is read by the code scanner 18 contains stock keeping unit (SKU) data. The SKU data may be, for example, a code (company prefix) showing a company name and a code (product code; commodity code or commodity group code) classifying a product. The server 5 stores a product database that contains EPC data to be encoded in an inlay INL and an affixing instruction image or the like, in association with the SKU data.

Operation of this embodiment is as follows.

At the time of issuing a label, the printer 1A inquires the server 5 based on the SKU data received from the code scanner 18. The server 5 refers to the product database to read the EPC data and the affixing instruction image or the like corresponding to the SKU data on which the inquiry is based, and then it sends these data to the printer 1A.

The control unit 11 of the printer 1A that has received the EPC data and the affixing instruction image controls the interrogator 19 so that the EPC data will be encoded in the inlay INL around the time of printing a label PL. The control unit 11 controls so that the bar code (that is, the bar code read by the code scanner 18) corresponding to the SKU data will be printed on a label. Moreover, the control unit 11 of the printer 1A controls the display unit 14 so that the affixing instruction image or the like received from the server 5 will be displayed on the display panel 14a.

Although this embodiment describes a case in which the EPC data is associated with the SKU data, for example, the server 5 may create EPC data based on the SKU data received from the printer 1A and send the created EPC data to the printer 1A.

In this embodiment, the function of the server 5 can also be implemented by the printer 1A. In this case, the printer 1A stores the product database and displays the affixing instruction image or the like on the display panel 14a without inquiring the server 5.

(6) Sixth Embodiment

Next, a sixth embodiment will be described.

Figure 12:
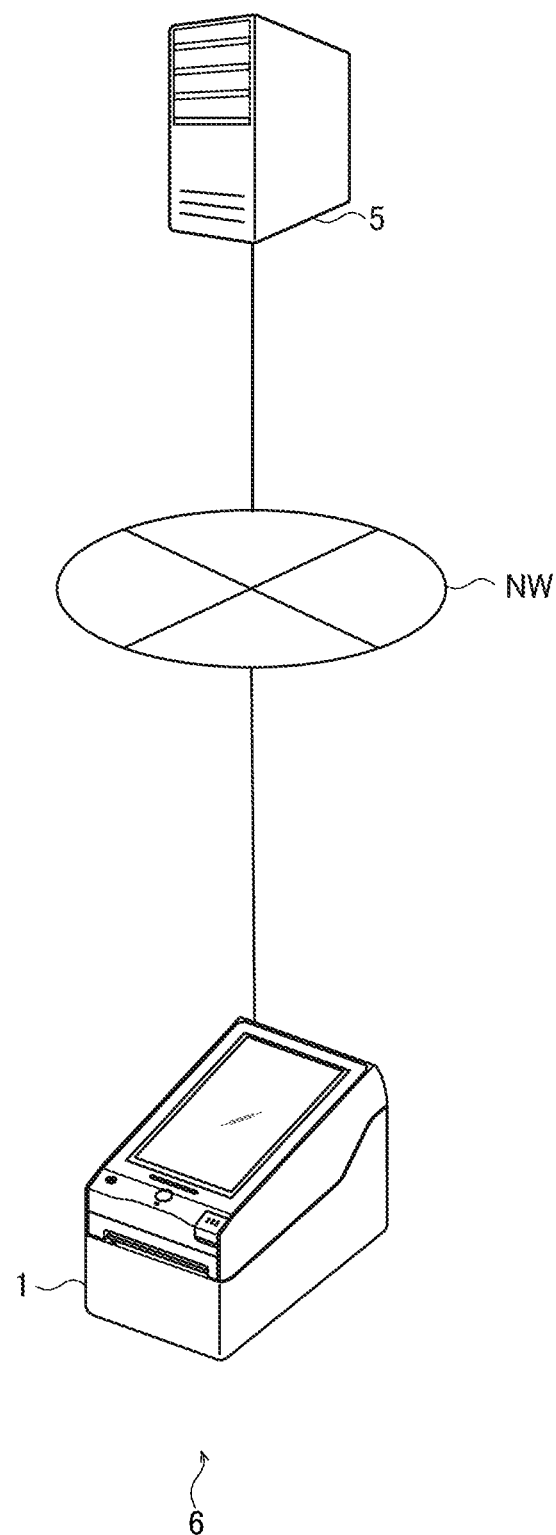
FIG. 12 schematically shows a system including a printer and a server.

This embodiment describes an information processing system in which the printer 1B referred to in the third embodiment is communicable with a server 5 via a network NW, as shown in FIG. 12.

The server 5 of this embodiment stores a product database that contains a tag ID (TID) unique to an inlay INL and an affixing instruction image or the like of a product, in a manner associated with each other. The TID (example of identification information unique to an RFID inlay) is a unique code stored in an IC chip of an inlay and is data that cannot be overwritten at the time of encoding by the printer.

FIG. 13 shows an example of data components of a product database according to an example of this embodiment.

In the example shown in FIG. 13, each record of the product database stores a value of each of fields "TID", "APPLICATION OF INLAY", and "AFFIXING INSTRUCTION IMAGE". Although the applications of an inlay include applications of a label itself, such as a shipping label and a price tag, in the example shown in FIG. 13, they may be categories (for example, cosmetics, camera, etc.) of products to which labels are affixed. Although not shown in FIG. 13, the product database may store communication setting information (communication parameters), such as size of a label, feed distance, communication feed speed, and electromagnetic wave level, in association with the TID. The feed distance means a feed distance necessary for a label to reach a communication region with the interrogator 19 in the printer 1B. The communication feed speed means a feed speed at which the communication region with the interrogator 19 is passed through in the printer 1B. The electromagnetic wave level is data relating to the intensity of electromagnetic waves emitted from the interrogator 19.

In this embodiment, the printer 1B causes the interrogator 19 to read a TID from one or each of multiple inlays while a label is rolled out from the roll and is fed though the path. Then, the control unit 11 of the printer 1B inquires the server 5 based on the TID read by the interrogator 19.

When receiving an inquiry from the printer 1B, the server 5 refers to the product database to read an affixing instruction image or the like corresponding to the TID on which the inquiry is based, and then sends it to the printer 1B. The control unit 11 of the printer 1B controls the display unit 14 so that the affixing instruction image or the like acquired from the server 5 will be displayed on the display panel 14a.

FIG. 13 shows a case in which the affixing instruction images or the like are recorded in association with the TIDs in the product database, but the data components are not limited thereto. A product or a category of a product to which a label containing an inlay is to be affixed can be presumed from a TID in some cases. In such cases, for example, the product database contains a product or a product category and an affixing instruction image or the like in associated with each other. The server 5 presumes a product or a product category from the TID received from the printer 1B and sends an affixing instruction image or the like corresponding to the presumed product or the product category, to the printer 1B.

In this embodiment, the function of the server 5 can also be implemented by the printer 1B. In this case, the printer 1B stores the product database and displays the affixing instruction image or the like on the display panel 14a without inquiring the server 5.

Although some embodiments of the printer and the program are described above, the present invention should not be limited to the foregoing embodiments. In addition, the embodiments described above can be variously modified and altered within the scope not departing from the gist of the present invention.

In the above-described embodiments, an imaging unit may be used in order to identify a product. In one example, an imaging unit may be installed in the printer 1 or connected to the printer 1 with a wired or wireless connection for example, and an affixing instruction image or the like of a product may be displayed based on an image of the product that is obtained by the imaging unit. In this case, the control unit 11 of the printer 1 may presume a product from shape, size, material, or another factor, based on the obtained image of the product, by an image presumption technique using artificial intelligence (AI) or the like. Then, the control unit 11 may acquire, from the product database, an affixing instruction image or the like corresponding to the presumed product and may display the acquired data.

The fifth and the sixth embodiments describe a case in which the product database is stored in the server 5, but the storage location is not limited to this. The product database may be provided in each of the printers 1A and 1B. In this case, each of the printers 1A and 1B may display an affixing instruction image without inquiring the server 5.

The invention claimed is:

1. A printer configured to print information on a print medium, the printer comprising:
   a storage configured to store affixing position information relating to an affixing position in affixing the print medium to an item, in association with item information for identifying the item, the affixing position information including an affixing position and an affixing direction in accordance with a shape of a surface of the item on which the print medium is to be affixed; and
   a processor configured to:
   receive the item information;
   acquire from the storage the affixing position information associated with the item information received by the processor, based on the item information received by the processor; and
   cause a display to display the affixing position information acquired by the processor.

2. The printer according to claim 1, wherein the processor is configured to cause the display to display an operation content for issuing the print medium that is to be affixed to the item corresponding to the affixing position information that is displayed.

3. The printer according to claim 2, wherein the print medium includes an RFID, and the printer further includes an RFID interrogator that writes information in the RFID around a time of printing the print medium.

4. The printer according to claim 2, further comprising a communication interface circuit configured to communicate with a reader that reads code information, and the processor is configured to receive input of the item information based on the code information from the reader received by the communication unit.

5. The printer according to claim 1, wherein the print medium includes an RFID, and the printer further includes an RFID interrogator that writes information in the RFID around a time of printing the print medium.

6. The printer according to claim 5, further comprising a communication interface circuit configured to communicate with a reader that reads code information, and the processor is configured to receive input of the item information based on the code information from the reader received by the communication interface circuit.

7. The printer according to claim 1, further comprising a communication interface circuit configured to communicate with a reader that reads code information, and the processor is configured to receive input of the item information based on the code information from the reader received by the communication interface circuit.

8. The printer according to claim 1, wherein the affixing item information includes information relating to a position to avoid affixing the print medium to the item.

9. The printer according to claim 1, wherein the processor is configured to cause the display to further display an image of the item together with the affixing position information.

10. A non-transitory computer-readable recording medium storing a program that, when installed in a printer configured to print information on a print medium and issue the printed print medium, causes a computer to perform a method, the method comprising the steps of:
   receiving input of item information for identifying an item;
   acquiring affixing position information corresponding to the received item information, by accessing a storage of the printer, the storage storing the affixing position information relating to an affixing position in affixing the print medium to the item, in association with the item information for identifying the item, the affixing position information including an affixing position and an affixing direction in accordance with a shape of a surface of the item on which the print medium is to be affixed; and
   causing a display of the printer to display the acquired affixing position information.

11. A printer configured to access a server that stores affixing position information relating to an affixing position in affixing a print medium to an item, in association with item information for identifying the item, the affixing position information including an affixing position and an affixing direction in accordance with a shape of a surface of the item on which the print medium is to be affixed, the printer comprising a processor configured to:
   receive the item information;
   inquire the server based on the item information received by the processor;

acquire from the server the affixing position information associated with the item information received by the processor, in response to the inquiry; and cause a display to display the affixing position information acquired by the processor.

12. A printer configured to access a server that stores affixing position information relating to an affixing position in affixing a print medium including an RFID to an item, in association with identification information unique to the RFID, the affixing position information including an affixing position and an affixing direction in accordance with a shape of a surface of the item on which the print medium is to be affixed, the printer comprising:

an RFID reader configured to read from the RFID the identification information unique to the RFID of the print medium around a time of printing the print medium; and a processor configured to:

inquire the server based on the identification information that is read by the RFID reader;

acquire from the server the affixing position information associated with the identification information, in response to the inquiry; and cause a display to display the affixing position information acquired by the processor.

* * * * *